United States Patent Office 3,469,009
Patented Sept. 23, 1969

3,469,009
BENZOTHIAZOLIUM COMPLEXES FOR CONTROL OF PARASITIC ORGANISMS IN ANIMALS
Robert L. Klingbail, Midland, Mich., assignor to The Dow Chemical Company, Midland, Mich., a corporation of Delaware
No Drawing. Continuation-in-part of application Ser. No. 431,788, Feb. 11, 1965, which is a continuation-in-part of application Ser. No. 352,355, Mar. 16, 1964. This application Mar. 11, 1966, Ser. No. 533,436
Int. Cl. A01n 9/22; A61k 27/00
U.S. Cl. 424—270
19 Claims

ABSTRACT OF THE DISCLOSURE

The present disclosure is directed to methods useful for the control of parasitic organisms including methods comprising the administration to animals of various benzothiazolium compounds complexed with various phenolic or urea compounds and compositions containing such complexes. Such administration is particularly useful to improve the growth of animals and to mitigate the attack of parasitic organisms.

CROSS-REFERENCE TO RELATED APPLICATIONS

This is a continuation-in-part of my co-pending patent application Ser. No. 431,788, filed Feb. 11, 1965, now abandoned, which in turn is a continuation-in-part of my co-pending patent application Ser. No. 352,355, filed Mar. 16, 1964, now abandoned.

This invention relates to animal husbandry and more particularly to methods and compositions adapted to be employed for improving the growth of animals, for improving the efficiency of the utilization of animal feed, for controlling parasitic organisms and for mitigating against the attack of parasitic organisms.

It is an object of the present invention to provide a new and improved practice for raising and benefiting warm-blooded animals such as mice, pigs, dogs, lambs, calves, chickens, ducks, pigeons, geese, and turkeys. A further object is to provide a new and improved method for mitigating against and protecting animals from the attack of parasitic organisms. An additional object is the provision of a method of improving the utilization of feed by animals and for improving feed efficiency. Another object is the improvement in the nutritive value of the feed ingested and utilized by animals so as to obtain a growth-furthering effect and an improved feed utilization. Another object is to provide a novel method for the control of nematode, helminth and other parasitic organisms which attack animals. It is a particular object of the present invention to provide a novel method for controlling such parasitic organisms in the egg and larval stages; an additional particular object is to provide a novel method for preventing and/or controlling the development of that stage of a parasitic organism which is known as the "migratory," in which state the organism migrates through the blood stream and/or lymph system of the host into a great variety of other internal organs of the host's body, such as the liver and lungs. Another object is to provide a novel method for benefiting and improving the growth of animals. Still another object is to provide a method which can be employed prophylactically to protect animals from the attack of parasitic organisms without adversely affecting the metabolic activity, reproduction, blood formation, or other function of animals, and without in any way causing detriment to the animals. More particularly, it is a further object to provide a method which can be employed prophylactically to protect animals from the attack of parasitic organisms in the egg and larval stages. A yet further object is to provide novel feed compositions and other novel compositions adapted to be employed in the new methods in animal husbandry. Other objects will appear throughout the following specification and appended claims.

The present invention is directed to methods employing and compositions comprising as active material a complex of a benzothiazolium compound of the formula

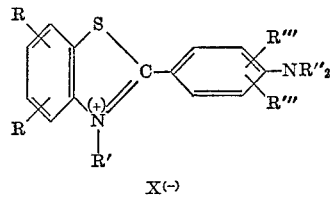

with a phenolic compound or a urea compound.

In the above and succeeding formulae, X represents a member selected from the group consisting of halide, $-HSO_4$, $-R'SO_4$, $-H_2PO_4$, $-O_3S-\langle\phantom{x}\rangle-CH_3$, and $-O_3S-CH_3$ each R independently represents a member selected from the group consisting of hydrogen, loweralkyl, loweralkoxy, bromo, and chloro; each R' and R'' independently represents primary loweralkyl; and each R''' independently represents a member selected from the group consisting of hydrogen, chloro, methoxy, and methyl. In the present specification and claims, the unmodified term "loweralkyl" and the term "loweralkoxy" are employed to designate alkyl and alkoxy, respectively, radicals being of from 1 to 4, both inclusive, carbon atoms. The term "primary loweralkyl" designates an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. As employed in the present specification and claims, the terms "halide" and "halo" designate appearances of chlorine, bromine, and iodine atoms, only.

The term "phenolic compound" is employed in the present specification and claims to designate a compound of the following formula only:

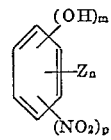

wherein each Z independently represents, subject only to known factors of steric hindrance, a member selected from the group consisting of halo, alkyl, and loweralkoxy; the symbol $m$ represents an integer of from 1 to 6, both inclusive, the symbol $n$ represents an integer of from 0 to 5, both inclusive, and the symbol $p$ represents an integer of from 0 to 2, both inclusive, the sum of $m$, $n$, and $p$ being an integer of from 1 to 6, both inclusive. The term "alkyl" is employed in the present specification and claims to designate an alkyl radical being of from 1 to 6, both inclusive, carbon atoms.

Representative phenolic compounds include phenol, p-iodophenol, p-nitrophenol, pyrocatechol, resorcinol, hydroquinone, pyrogallol, 1,2,4-benzenetriol, phloroglucinol, 1,2,4,5-benzenetetrol, benzenehexol, o-methoxyphenol, 2,4,5-trichdorophenol, 2,4-dinitrophenol, m-cresol, p-cresol, 4-n-hexylresorcinol, cresol, 4-bromo-m-cresol, 4-ethylresorcinol, tetrachloropyrocatechol, 4-nitropyrocatechol, 2,5-dimethoxyhydroquinone, trichloropyrogallol, and dimethylphloroglucinol.

The term "urea compound" is employed in the present specification and claims to designate only a member selected from the group consisting of urea, thiourea, guanidine, guanidine hydrochloride, and biuret.

The complex to be employed in accordance with the present invention can exist as a hydrate, and it is frequently convenient to prepare and separate the material as a hydrate. Ordinarily the hydrate is a hemihydrate, monohydrate, or dihydrate. However, hydrates having other ratios of water and active material oftentimes exist and can be employed. Thus, in the present specification and claims, the definition of active material as employed is inclusive of the hydrated active material. Generally, the present complex of benzothiazolium compound with a phenolic compound or with a urea compound exists as a 1:1 complex, that is, one molecule of benzothiazolium compound and one molecule of phenolic compound or urea compound; as a 2:1 complex, that is, two molecules of benzothiazolium compound and one molecule of phenolic compound or urea compound; or as a 1:2 complex, that is, two molecules of phenolic compound or urea compound and one molecule of benzothiazolium compound. However, complexes having other ratios sometimes exist and can be employed.

In an alternate expression, the active material to be employed in accordance with the present invention can be said to be of the formula:

$$[G]_m \cdot [Z]_n$$

wherein G, in each of its $m$ occurrences, represents the benzothiazolium compound as hereinabove defined; Z, in each of its $n$ occurrences, represents the same member selected from the group consisting of a phenolic compound and a urea compound; and each of $m$ and $n$ represents an integer being of from 1 to 2, both inclusive, the sum of $m$ and $n$ being an integer of from 2 to 3, both inclusive.

Representative compounds to be employed according to the present specification and claims include 2-(p-dimethylaminophenyl-3,6-dimethylbenzothiazolium p-toluenesulfonate complex with urea;
2-(p-dimethylaminophenyl)-3,6-dimethylbenzothiazolium chloride complex with resorcinol;
2-(p-dimethylaminophenyl)-3-methylbenzothiazolium chloride complex with resorcinol;
2-(p-dimethylaminophenyl)-3,6-dimethylbenzothiazolium bromide complex with resorcinol;
2-(p-dimethylaminophenyl)-6-chloro-3-methylbenzothiazolium iodide 2:1 complex with urea;
2-(p-dimethylaminophenyl)-3-methylbenzothiazolium bromide complex with resorcinol;
2-(p-dimethylamionphenyl)-3,6-dimethylbenzothiazolium iodide 2:1 complex with resorcinol;
2-(p-dimethylaminophenyl)-3-methylbenzothiazolium iodide complex with resorcinol;
2-(p-dimethylaminophenyl)-3-methylbenzothiazolium p-toluenesulfonate complex with resorcinol;
2-(p-di-n-butylaminophenyl)-3-me hylbenzothiazolium chloride complex with resorcinol;
2-(p-diethylaminophenyl)-3,6-dimethylbenzothiazolium chloride complex with resorcinol;
2-(p-diethylaminophenyl)-3-methylbenzothiazolium chloride complex with resorcinol;
2-(p-ethylmethylaminophenyl)-3,6-dimethylbenzothiazolium bromide complex with resorcinol;
2-(p-dimethylaminophenyl)-6-methyl-3-ethylbenzothiazolium bromide 2:1 complex with resorcinol;
2-(p-diisobutylaminophenyl)-3-methylbenzothiazolium bromide complex with resorcinol;
2-(p-diethylaminophenyl)-3,6-dimethylbenzothiazolium iodide complex with resorcinol;
2-(p-di-n-propylaminophenyl)-3-methylbenzothiazolium iodide complex with resorcinol;
2-(p-diethylaminophenyl)-3-methylbenzothiazolium hydrogen sulfate complex with urea;
2-(p-diethylaminophenyl)-3-ethylbenzothiazolium ethyl sulfate complex with resorcinol;
2-(p-di-n-propylaminophenyl)-3-n-propylbenzothiazolium dihydrogen phosphate complex with urea;
2-(p-diisobutylaminophenyl)-4,5-dimethyl-3-n-butylbenzothiazolium iodide complex with resorcinol;
2-(p-di-n-butylaminophenyl)-5-tert-butyl-3-methylbenzothiazolium methyl sulfate complex with resorcinol;
2-(p-diethylaminophenyl)-4-methoxy-3-ethylbenzothiazolium chloride complex with resorcinol;
2-(p-di-n-butylaminophenyl)-5-bromo-3-n-propylbenzothiazolium n-propyl sulfate complex with resorcinol;
2-(p-diethylaminophenyl)-4-chloro-3-methylbenzothiazolium methyl sulfate complex with resorcinol;
2-(p-diethylaminophenyl)- 4-methyl-6-isopropyl-3-isobutylbenzothiazolium bromide complex with resorcinol;
2-(p-diisobutylaminophenyl)-5-methoxy-6-methyl-3-ethylbenzothiazolium ethyl sulfate complex with resorcinol;
2-(p-di-n-propylaminophenyl)-6-ethyl-7-bromo-3-methylbenzothiazolium chloride complex with resorcinol;
2-(p-ethylmethylaminophenyl)-5-n-butyl-6-chloro-3-methylbenzothiazolium dihydrogen phosphate complex with resorcinol;
2-(p-ethylisobutylaminophenyl)-5,6-dimethoxy-3-n-butylbenzothiazolium iodide complex with urea;
2-(p-ethyl-n-propylaminophenyl)-4-ethoxy-7-sec-butoxy-3-ethylbenzothiazolium ethyl sulfate complex with resorcinol;
2-(p-methyl-n-butylaminophenyl)-5-bromo-6-ethoxy-3-n-butylbenzothiazolium n-butyl sulfate complex with resorcinol;
2-(p-diethylaminophenyl)-4-chloro-6-tert-butoxy-3-methylbenzothiazolium dihydrogen phosphate complex with urea;
2-(p-ethyl-n-propylaminophenyl)-4,7-dibromo-3-ethylbenzothiazolium hydrogen sulfate complex with thiourea;
2-(p-dimethylaminophenyl)-5-chloro-3-methylbenzothiazolium chloride complex with guanidine;
2-(p-methyl-n-butylaminophenyl)-5-bromo-6-chloro-3-isobutylbenzothiazolium dihydrogen phosphate complex with biuret;
2-(p-ethyl-n-propylaminophenyl)-4,7-dibromo-3-ethylbenzothiazolium hydrogen sulfate complex with phenol;
2-(p-diethylaminophenyl)-5-bromo-3,6-diethylbenzothiazolium p-toluenesulfonate complex with pyrogallol;
2-(p-methyl-n-butylaminophenyl)-5-bromo-6-chloro-3-isobutylbenzothiazolium isobutyl sulfate complex with cresol;
2-(p-dimethylaminophenyl)-4,6-dichloro-3-n-propylbenzothiazolium dihydrogen phosphate complex with 4-ethyl resorcinol;
2-(p-dimethylaminophenyl)-3,6-dimethylbenzothiazolium chloride complex with guanidine hydrochloride;
2-(p-dimethylaminophenyl)-3,6-dimethylbenzothiazolium chloride hydrochloride complex with benzenehexol;

Also 2-(p-dimethylaminophenyl)-3-methylbenzothiazolium chloride complex with 4-bromo-m-cresol;
2-(p-dimethylaminophenyl)-3-n-propylbenzothiazolium iodide complex with pyrocatechol;
2-(p-dimethylaminophenyl)-3,6-dimethylbenzothiazolium methanesulfonate complex with hydroquinone;
2-(p-dimethylaminophenyl)-6-chloro-3-methylbenzothiazolium iodide complex with urea;
2-(p-dimethylaminophenyl)-6-methoxy-3-methylbenzothiazolium iodide complex with thiourea;
2-(p-dimethylaminophenyl)-3,6-dimethylbenzothiazolium chloride 1:2 complex with thiourea;
2-(p-dimethylaminophenyl)-3,6-dimethylbenzothiazolium chloride 1:1 complex with urea, monohydrate;
2-(p-dimethylaminophenyl)-3,6-dimethylbenzothiazolium chloride 1:2 complex with urea, hemihydrate;

2-(p-dimethylaminophenyl)-3,6-dimethylbenzothiazolium iodide 1:1 complex with urea;
2-(p-dimethylaminophenyl)-3,6-dimethylbenzothiazolium chloride 1:2 complex with biuret;
2-(p-dimethylaminophenyl)-3,6-dimethylbenzothiazolium chloride 1:1 complex with guanidine hydrochloride;
2-(p-dimethylaminophenyl)-3,6-dimethylbenzothiazolium chloride 1:1 complex with guanidine hydrochloride, dihydrate;
2-(p-dimethylaminophenyl)-3,6-dimethylbenzothiazolium chloride 1:2 complex with phenol;
2-(4-diethylamino-o-tolyl)-6-bromo-3-methylbenzothiazolium methanesulfonate complex with creosol;
2-(p-dimethylaminophenyl)-3,6-dimethylbenzothiazolium chloride 1:1 complex with o-methoxyphenol;
2-(4-dimethylamino-3,5-xylyl)-3,6-dimethylbenzothiazolium chloride complex with phenol;
2-(p-dimethylaminophenyl)-3,6-dimethylbenzothiazolium chloride 1:1 complex with pyrocatechol;
2-(3-methoxy-4-dimethylaminophenyl)-3-methylbenzothiazolium bromide complex with o-methoxyphenol;
2-(p-dimethylaminophenyl)-3,6-dimethylbenzothiazolium chloride 1:1 complex with hydroquinone, monohydrate;
2-(p-dimethylaminophenyl)-3,6-dimethylbenzothiazolium chloride 1:1 complex with phloroglucinol, monohydrate;
2-(p-dimethylaminophenyl)-3,6-dimethylbenzothiazolium chloride complex with dimethylphloroglucinol;
2-(p-dimethylaminophenyl)-3,6-dimethylbenzothiazolium chloride 1:1 complex with pyrogallol, hemihydrate;
2-(2-chloro-4-dimethylaminophenyl)-3,6-dimethylbenzothiazolium iodide complex with trichloropyrogallol;
2-(p-dimethylaminophenyl)-3,5,6-trimethylbenzothiazolium chloride 1:1 complex with resorcinol;
2-(p-dimethyaminophenyl)-3,6-dimethylbenzothiazolium chloride 1:2 complex with 2,4,5-trichlorophenol;
2-(p-dimethylaminophenyl)-3-methylbenzothiazolium chloride 1:1 complex with urea;
2-(4-dimethylamino-m-tolyl)-3-methylbenzothiazolium chloride 1:2 complex with urea;
2-(p-dimethylaminophenyl)-3-methylbenzothiazoliumchloride complex with hydroquinone;
2-(p-dimethylaminophenyl)-3,6-dimethylbenzothiazolium chloride 1:1 complex with 4-n-hexylresorcinol;
2-(p-dimethylaminophenyl)-3-methylbenzothiazoliumchloride complex with biuret;
2-(4-diethylamino-3-chlorophenyl)-3-methylbenzothiazolium bromide complex with urea;
2-(4-dimethylamino-2,5-dichlorophenyl)-5,6-dimethyl-3-ethylbenzothiazolium iodide complex with guanidine;
2-(4-diethylamino-2,5-dichlorophenyl)-5,6-dimethyl-3-ethylbenzothiazolium iodide complex with thiourea;
2-(4-di-n-propylamino-6-chloro-m-tolyl)-3,6-diethylbenzothiazolium hydrogen sulfate complex with guanidine hydrochloride;
2-(4-di-n-butylamino-3-methoxyphenyl)-6-n-butyl-4-chloro-3-n-propylbenzothiazolium methyl sulfate complex with urea;
2-(p-dimethylaminophenyl)-6-isopropyl-4-methoxy-3-n-butylbenzothiazolium chloride complex with thiourea;
2-(4-diethylamino-3,5-xylyl)-5,6-diethoxy-3-isobutylbenzothiazolium dihydrogen phosphate complex with biuret;
2-(p-diisobutylaminophenyl)-6-n-butoxy-3-methylbenzothiazolium p-toluenesulfonate complex with urea;
2-(4-dimethylamino-2,5-dimethoxyphenyl)-5,6-dibromo-3-methylbenzothiazolium iodide complex with thiourea;
2-(4-dimethylamino-m-tolyl)-6-chloro-3,4-dimethylbenzothiazolium methyl sulfate complex with thiourea;
2-(p-diethylaminophenyl)-4,7-dichloro-3-ethylbenzothiazolium bromide complex with urea; and
2-(p-ethylmethylaminophenyl)-3,6-dimethylbenzothiazolium chloride complex with guanidine.

Most broadly, the present invention is concerned with methods and compositions useful in animal husbandry. Thus, in one embodiment, the present invention is directed to a method which comprises administering to an animal a complex of benzothiazolium compound of the formula

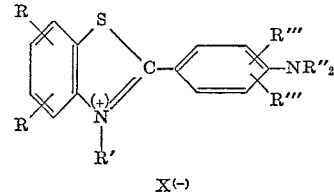

with a phenolic compound or a urea compound, wherein, in said benzothiazolium compound, X represents a member selected from the group consisting of halide,

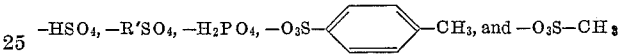

each R independently represents a member selected from the group cosisting of hydrogen, loweralkyl, loweralkoxy, bromo, and chloro; each R' and R'' independently represents primary loweralkyl; and each R''' independently represents a member selected from the group consisting of hydrogen, chloro, methoxy, and methyl.

The practice of this embodiment of the present invention, even at very low rates of administration, improves the nutritive value of animal feed so as to obtain a growth-furthering effect and improve the efficiency of the utilization of feed by animals. The practice also improves the growth made by the animals and, especially at rates of administration in excess of the very low rates, protects the animals from the attack of such parasitic organisms as Nematodirus, Ascaris, Haemonchus, Chabertia, Trichostrongylus, Strongyloides, *Nacator americanus.* Moniezia, Thysanosoma, Ostertagia, Trichuris, Cooperia, Bunostumum, Oesophagostomum, Toxascaris, Hymenolepis, Aspicularis, Syphacia, Ancylostoma, Uncinaria, Taenia, Toxocara, Dipylidium and Physaloptera, in normal or abnormal hosts.

The compounds to be employed according to the present invention are crystalline solids which are somewhat soluble in organic solvents and are adapted to be administered to animals. The compounds are not repellent to animals and can be employed in admixture with grain rations or animal feeds. They can be administered continuously or intermittently in dosages sufficient to improve growth, to improve the feed efficiency, to improve the nutritive value and utilization of feed or to protect the animal from the attack of parasite organisms without in any way causing detriment to the animal or without imparting any unpalatable characteristic to animal flesh.

The administration or feeding of an effective growth-improving dosage of at least one of the compounds to be employed according to the present invention is essential and critical for the practice of this embodiment of the present invention. The amount of one or more of the compounds which will constitute an effective dosage varies considerably and is dependent upon such factors as the animal concerned, the age of the animal, the parasitic organism against which protection is sought, the life stage of such organism against which protection is sought, the particular compound employed, and the like. In general, good results are obtained when there is administered to an animal a dosage of from 0.01 to 1,000 milligrams of one of the compounds per kilogram of body weight and preferably from 0.01 to 500 milligrams per kilogram of body weight. Where the compound is administered on a daily schedule, good results are obtained when employing daily dosages of from 0.01 to 150 milligrams on more of one of the compounds per kilogram of animal body weight. Where parasite control is the main objective of treatment and the danger of reexposure to the attack of intestinal parasites from contaminated feed or surroundings is low, good results are obtained when there is administered to an animal a daily dosage of from 0.5 to 50 milligrams or more per kilogram of body weight. Where such danger of reexposure is very low, good results are frequently obtained when an animal is dosed on a single occasion with from 2.5 to 1,000 milligrams of one of the compounds per kilogram of body weight. Where protection against parasite attack is of minimal importance and growth stimulation is the main objective of treatment, lower rates suffice; in this practice, good results are usually obtained when there is administered to an animal a daily dosage of from 0.01 to 5 milligrams per kilogram of body weight. A larger dosage can be employed in this practice; however, the use of such dosage does not usually result in greater growth stimulation, and, in view of economic considerations, is seldom desirable.

The method of this embodiment of the present invention can be carried out by administration or feeding of the unmodified compounds. However, the present invention embraces the employment of any liquid, powder, mash, drench, bolus, pellet, capsule or other animal food containing one or more of the active compounds. In such usage, the compounds can be modified with one or more of a plurality of additaments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material can also be dispersed, with or without vitamin, mineral, or other feed supplements, upon a material, such as sphagnum moss, which serves as an edible mechanical support or roughage. The resulting treated material is employed as, or in addition to other, animal feed, or supplied to young nursing animals not yet feeding on the feed ration normally fed to the adult animals.

The exact concentration of the compounds to be employed in the compositions can vary provided that enough of the composition is ingested by the animal so as to provide the required internal amount of active ingredient. For example, where direct administration to the individual animal is preferred, liquid or solid compositions containing from 0.5 to 98 percent by weight of one or more of the agents conveniently are employed to supply the desired dosage. Representative of this type of composition is the relatively concentrated composition containing one of the active agents and nutritive supplementary materials, which composition is provided for the ad libitum consumption by animals, that is, a "salt-block" type of composition. Also representative of such compositions is a slow-release type of composition containing one of the active agents in the form of small pellets or granules which are administered orally and which lodge internally and release their contents over an extended period of time. Where one or more of the compounds is provided as a constituent of the principal food or water ration, satisfactory results are obtained with rations containing a minor but effective amount of the compounds.

The exact amounts of the compounds in the ration or drinking water are dependent upon the food and water consumption and feeding and watering habits of the animal concerned. In animal feeds, the required dosage can be supplied with feeds containing 0.0001 percent or more and usually from 0.0001 to 0.5 percent by weight of active material. When fed as the principal food ration, the required dosage is conveniently supplied with feeds containing from 0.0001 to 0.3 percent by weight of active material. Where parasite control is the main objective of treatment, feeds containing from 0.001 to 0.3 percent by weight of active material give good results. Where growth stimulation with or without parasite control is the main objective, feeds containing a lower concentration of active material, such as from 0.0001 to 0.01 percent, are adequate and give good results. Where the compounds are furnished in the drinking water, good results are obtained at concentrations of the agents in the water equal to one-half those employed when the compounds are supplied as a constituent in the principal food ration. In compositions to be employed as concentrates, the active agents can be present in a concentration of from 0.5 to 98 or 5 to 98 percent by weight. Preferred concentrate compositions oftentimes contain two or more percent by weight of a liquid or solid surface active agent.

Liquid feed compositions containing the desired amount of the compounds can be prepared by dissolving the compounds in ethanol, propylene glycol or an edible oil or by dispersing them in water with or without the aid of a suitable surface active dispersing agent such as an ionic or non-ionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute an aqueous emulsion adjuvant or helper.

In the preparation of solid feed compositions, the compounds can be mechanically ground with an edible solid such as cereal meal, ground yellow corn, ground oats, finely ground meat and bone scraps, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

Where the parasite control of the foregoing embodiment is the prime object, such control can be achieved in another embodiment. In this embodiment, the present invention is directed to a method for the control of a parasitic organism which is a parasite of a host animal body, which comprises contacting the parasitic organism in its infective phase outside the host animal body with a parasiticidal amount of an active material which is a complex of a benzothiazolium compound of the formula

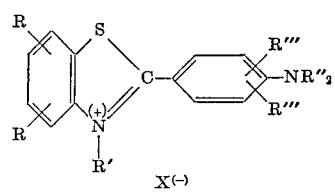

with a phenolic compound or a urea compound, wherein, in said benzothiazolium compound, X represents a member selected from the group consisting of halide,

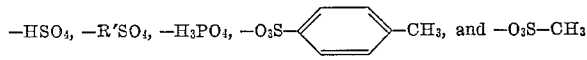

each R independently represents a member selected from the group consisting of hydrogen, loweralkyl, loweralkoxy, bromo, and chloro; each R' and R'' independently represents primary loweralkyl; and each R''' independently represents a member selected from the group consisting of hydrogen, chloro, methoxy, and methyl.

Thus, the same active material is employed in, and the same kinds of parasites are controlled by, both embodiments, the present embodiment wherein the infective phase of the parasite is contacted outside of the host animal body, as well as the previous embodiment wherein the parasite is contacted inside the host animal body by administration of the active material to the host. However, the previous embodiment has growth-enhancing effects independent from its parasiticidal effects and for this reason, the previous embodiment is generally preferred.

While the terms "infective stage" and "infective phase" are equivalent as to meaning and are well known and understood in the field of parasitology, the particular developmental stage of the parasitic organism which is the infective stage or phase varies with the identity of the specific parasitic organism. Most commonly, the infective phase is the egg of the organism; in other instances, such as in some of the ascarids, that is, those parasitic organisms which are of the family Ascaridae, the infective phase is an egg which, following its passage from a prior host animal body, develops into a form known as an embroyonated egg. In still other instances, the infective phase is a larval form. However, the method of this embodiment is effective regardless of the developmental stage which is the infective phase of a given parasitic organism.

The contacting of a parasite in its infective phase outside the host animal body with a parasiticidal amount of the active material is essential and critical to the practice of this embodiment of the present invention. This embodiment can be carried out by application of the unmodified products. However, it is more conveniently carried out by employing the active material in a composition, which may be a liquid, dust, or granular solid composition.

In liquid, dust, or granular compositions, the active material is modified with one or a plurality of additaments or adjuvants for parasiticidal compositions such as water or other liquid carriers, surface-active dispersing agents and finely divided solids. Depending upon the concentration of active compound, such augmented compositions are adapted to be applied to parasites in their infective phase or to be employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound.

The exact concentration of the active material to be employed in the treating compositions is not critical and may vary considerably provided the required dosage of active material is supplied upon the parasitic organism or its habitat. The concentration of the active material in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active material can be present in a concentration of from about 5 to 98 percent by weight.

The quantity of the composition applied is not critical provided only that the required dosage of active material is applied in sufficient quantity of the finished composition to cover adequately the habitat of parasitic organisms to be controlled.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active material such as talc, chalk, gypsum and the like. In such operations, the finely divided carrier is mixed with the active material or a volatile organic solvent solution thereof. Similarly, dust compositions containing the active material are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active material in compositions adapted to be employed for the control of parasitic organisms outside of the host animal body. Also, such concentrated dust compositions can be dispersed in water with or without the aid of a dispersing agent, to form spray mixtures.

When operating in accordance with this embodiment of the present invention, the active material or preferably a composition comprising the active material is applied to interior walls and floors of barns, animal pens, and the like in any convenient fashion, for example, with power sprayers and dusters and boom and hand sprayers.

The following examples illustrate the invention but are not to be construed as limiting.

Example 1

The complex of 2-(p-dimethylaminophenyl)-3,6-dimethylbenzothiazolium chloride with resorcinol was dispersed in mouse feed to prepare a feed composition containing about 2.5 parts of the subject compound per one thousand parts by weight of the total feed composition. This feed composition and unmodified mouse feed were fed as sole feed rations to groups of mice having a heavy infestation of pinworms. About seven days following initiation of the diets, the mice were sacrificed. An examination of each mouse was made and the treated mice compared with the untreated check mice as regards the number of worms to be found in their gastro-intestinal tracts. As a result of the examination, there was found a complete kill and control of pinworms in the treated mice with a continued heavy infestation in the untreated check mice.

Example 2

The evaluation procedures of Example 1 are duplicated except that the employed treating feed composition contains, as active ingredients, 2.5 parts of the complex of 2 - (p - dimethylaminophenyl) - 3-methylbenzothiazolium chloride with resorcinol per one thousand parts by weight of total feed composition. Upon necropsy and examination of the mice, there is found a complete kill and control of pinworms in the treated mice and a continuing heavy infestation of pinworms in the untreated check group.

Example 3

The complex of 2-(p-dimethylaminophenyl)-3,6-dimethylbenzothiazolium chloride with resorcinol was incorporated in a complete mouse feed to prepare a feed composition containing 0.6 part of the subject compound per one thousand parts, by weight, of the total feed composition. This feed composition and unmodified feed were fed as sole rations to groups of mice which were heavily infested with Hymenolepis nana and Hymenolepis diminuta.

About seven days following the initiation of the diets, the mice were sacrificed and autopsied. An examination of each mouse was made and the treated mice compared with the untreated check mice as regards the number of worms to be found in their gastro-intestinal tracts. As a result of the examination, there was found a complete control of Hymenolepis nana and Hymenolepis diminuta in the treated mice with a continued heavy infestation in the untreated group.

Example 4

The complex of 2-(p-dimethylaminophenyl)-3,6-dimethylbenzothiazolium chloride with resorcinol was employed for the control of Strongyloides papillosus (threadworms) in sheep known to be heavily infested and voiding large numbers of Strongyloides papillosus ova in their feces. In these operations, the sheep were divided into two groups; to the sheep of one group, there was administered orally by means of a gelatin capsule sufficient quantity of the subject compound to provide 50 milligrams per kilogram of individual sheep weight. The other group of sheep was left untreated to serve as a check. About two weeks following the administration, the feces of the sheep were examined and counts of ova made and compared with pre-treatment counts to determine the percent reduction in fecal ova and control of intestinal parasites. In the treated group of sheep, there was found a 100 percent reduction of fecal ova and control of threadworms. The sheep of the untreated check group continued to void large numbers of threadworm ova.

Example 5

In procedures similar to those employed in Example 4, the complex of 2-(p-dimethylaminophenyl)-3,6-dimethylbenzothiazolium chloride with resorcinol was employed for the control of parasitic organisms in sheep voiding large numbers of ova in their feces, including ova of Haemonchus, Trichuris, Trichostrongylus, Cooperia, Bunostomum, Oesophagostomum, and Ostertagia. For a period of two days prior to the administration, the sheep were found to be voiding an average of 575 ova of the named parasitic organisms.

The sheep of one group were dosed by oral administration of a drench containing a sufficient amount of the subject compound to provide 100 milligrams thereof per kilogram of body weight of each sheep. Another group of sheep was left untreated to serve as a check. Two weeks after the administration, there was found in the sheep of the treated group a 100 percent control of the named parasitic organisms, while the control exhibited a heavy infestation of the named parasitic organisms.

Example 6

The compounds of the present invention are effective for the control of Ascaris lumbricoides var. suum in the adult stage. In representative procedures, the resorcinol complex of 2-(p-dimethylaminophenyl)-3,6-dimethylbenzothiazolium chloride was administered to swine voiding large numbers of Ascaris lumbricoides var. suum eggs. In these operations, the subject compound was dispersed in a commercial swine feed to produce a modified animal feed composition containing 0.1 percent of the subject compound by weight of the ultimate modified animal feed composition. In the operation, two groups of swine were employed; all of the swine were of the same history and past environment and were 9 to 10 weeks old. Feeding of the swine was begun, one group (the treated group) being fed the modified animal feed composition containing the subject compound, the second group (the control group) being fed the unmodified commercial swine feed. Simultaneously with the initiation of the feeding, fecal samples of the swine were microscopically examined and an average pre-treatment fecal egg count determined for each group. Feeding of the groups was continued for nine days at which time an average post-treatment fecal egg count was determined for each group. The pre-treatment and post-treatment egg counts were compared to determine the percent kill and control of Ascaris lumbricoides var. suum.

It was found that in the treated group, there was a 100 percent kill and control of Ascaris lumbricoides var. summ. The post-treatment fecal egg count of the control group was found to be essentially the same as the pre-treatment fecal egg count.

Examples 7–10

The compounds to be employed according to the present invention are also effective for the control of Ascaris lumbricoides var. suum in the larval stage and for the prevention and/or control of the migration of such Ascaris larvae. In representative operations, the resorcinol complex of 2-(p-dimethylaminophenyl)-3,6-dimethylbenzothiazolium chloride was incorporated in modified animal feed compositions in various amounts, representing in one such composition, 0.018 percent of subject compound by weight of ultimate modified feed composition; in a second, 0.015 percent; in a third, 0.012 percent; and in a fourth, 0.006 percent.

In these operations, groups of swine were employed; all of the swine were of the same history and past environment and were 5 to 6 weeks old. Feeding of the swine was begun; each modified feed composition was employed in a separate evaluation. In each evaluation one group (the treated group) was fed the modified animal feed composition containing the subject compound, and two other groups were fed the unmodified commercial swine feed, one to serve as an inoculated control group, the other to serve as an uninoculated control group. Simultaneously with the initiation of the feeding and 17 days thereafter, all of the swine were weighed and the average weight for each group determined. Seventy-two hours after initiation of the feeding, the animals of each group except the group serving as uninoculated control group were inoculated with an individual inoculation of 24,000 embryonated ova of Ascaris lumbricoides var. suum; a second inoculation of each animal with 25,000 embryonated ova of Ascaris lumbricoides var. suum was made ninety-six hours following initiation of the feeding to the same animals only. Thereafter, all of the swine were observed for the remainder of the 17-day period following initiation of the feeding for symptoms of the attack of migrating larvae of *Ascaris lumbricoides* var. *suum*. About 7 days after the first inoculation thereof with the Ascaris larvae, the swin of each of the inoculated control groups exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of *Ascaris lumbricoides* var. *suum* in the respiratory system. In each of the treated groups and in each of the uninoculated control groups, no symptoms of the attack of migratory Ascaris larvae were observed at any time, and the swine were judged to be in all respects normal and healthy.

The average weight per animal for each of the groups, the average weight gained per animal for each of the groups, and the feed efficiency for each group are set forth in the following table.

In identical procedures, concentrate compositions containing 90 percent by weight of one of the compounds to be employed according to the present invention are prepared from 2 - (p-dimethylaminophenyl)-3-methylbenzothiazolium chloride complex with resorcinol; 2-(p-dimethylaminophenyl) - 3,6-dimethylbenzothiazolium bromide complex with resorcinol; 2 - (p-dimethylaminophenyl)-3-methylbenzothiazolium bromide complex with resorcinol; 2 - (p-dimethylaminophenyl)-3,6-dimethylbenzothiazolium iodide complex with resorcinol; 2-(p-dimethylaminophenyl)-3-methylbenzothiazolium iodide complex with resorcinol; 2 - (p-dimethylaminophenyl) - 3-methylbenzothiazolium p-toluenesulfonate complex with resorcinol; 2-(p-dimethylaminophenyl) - 3,6-dimethylbenzothiazolium chloride 1:1 complex with urea; 2-(p-dimethylaminophenyl)-3,6-dimethylbenzothiazolium chloride 1:2 complex with urea; 2 - (p-dimethylaminophenyl)-3,6-dimethylbenzothi-

|  | Average Weight per Animal in Pounds | | Average weight gained per animal in pounds | Feed efficiency per group |
|---|---|---|---|---|
|  | Upon initiation of feeding | 17-days following initiation of feeding | | |
| Treated group feeding of animal feed containing 0.018 percent by weight of subject compound | 26.5 | 47.0 | 20.5 | 2.16 |
| Uninoculated control group | 20.0 | 33.5 | 13.5 | 2.41 |
| Inoculated control group | 19.0 | 25.5 | 6.5 | 3.38 |
| Treated group feeding on animal feed containing 0.015 percent by weight of subject compound | 21.5 | 36.0 | 14.5 | 2.07 |
| Uninoculated control group | 28.0 | 44.0 | 16.0 | 2.50 |
| Inoculated control group | 25.0 | 34.5 | 9.5 | 3.30 |
| Treated group feeding on animal feed containing 0.012 percent by weight of subject compound | 19.5 | 35.0 | 15.5 | 2.52 |
| Uninoculated control group | 17.0 | 30.0 | 13.0 | 3.0 |
| Inoculated control group | 22.0 | 30.5 | 8.5 | 4.47 |
| Treated group feeding on animal feed containing 0.006 percent by weight of subject compound | 24.0 | 39.0 | 15.0 | 2.57 |
| Uninoculated control group | 25.0 | 38.0 | 16.5 | 3.08 |
| Inoculated control group | 26.5 | 43.0 | | |

Example 11

Results essentially the same as those reported in Example 10 are obtained when modifying the procedures by employing as subject compound 2-(p-dimethylaminophenyl)-3-methylbenzothiazolium chloride 1:2 complex with urea.

Example 12

The subject compounds to be employed according to the present invention are also effectively employed for the control of parasitic organisms in dogs. In representative operations, the resorcinol complex of 2-(p-dimethylaminophenyl)-3,6-dimethylbenzothiazolium chloride was employed for the control of parasitic organisms in an adult dog voiding large numbers of eggs of *Ancylostoma caninum* (hookworm). In such operations, the subject compound was administered on a single occasion to the dog in such amount as to provide for a dosage of 1 milligram of subject compound per kilogram of body weight. Following the administration, the dog was maintained under conditions favorable to canine growth and well being for a period of about 5 days. At the end of the 5-day period, the dog was necropsied and the gastrointestinal tract examined to determine the percent kill and control of *Ancylostoma caninum* in the adult stage. This examination established that there was obtained a 100 percent kill and control of *Ancylostoma caninum*.

Example 13

Ninety parts by weight of 2-(p-dimethylaminophenyl)-3,6-dimethylbenzothiazolium chloride complex with resorcinol were mechanically ground with bentonite to produce a concentrate composition containing 90 percent by weight of the 2 - (p-dimethylaminophenyl)-3,6-dimethylbenzothiazolium chloride complex with resorcinol as subject compound.

azolium chloride 1:2 complex with thiourea; 2-(p-dimethylaminophenyl) - 3,6-dimethylbenzothiazolium chloride 1:1 complex with guanidine hydrochloride; 2-(p-dimethylaminophenyl)-3,6-dimethylbenzothiazolium chloride 1:2 complex with biuret; 2-(p-dimethylaminophenyl)-3,6-dimethylbenzothiazolium bromide 1:1 complex with urea; and 2-(p-dimethylaminophenyl)-3,6-dimethylbenzothiazolium iodide 1:1 complex with urea.

Example 14

In other procedures, feed supplements are prepared by grinding together 50 parts by weight of one of the compounds to be employed according to the present invention with one part of sorbitan monopalmitate (Span 20) and 49 parts of attapulgite clay to produce compositions containing 50 percent by weight of one of the subject compounds. In these procedures, feed supplements are prepared with the compounds identified in Example 13 and with 2 - (p-di-n-butylaminophenyl) - 3-methylbenzothiazolium chloride complex with urea; 2-(p-dimethylaminophenyl) - 6-methyl-3-ethylbenzothiazolium bromide complex with resorcinol; 2 - (p-diethylaminophenyl)-3,6-dimethylbenzothiazolium chloride complex with resorcinol; 2 - (p-diethylaminophenyl)-3-methylbenzothiazolium chloride complex with resorcinol; 2 - (p-ethylmethylaminophenyl) - 3,6-dimethylbenzothiazolium bromide complex with resorcinol; 2 - (p-dimethylaminophenyl)-6-methyl-3-ethylbenzothiazolium bromide complex with resorcinol; 2-(p-diisobutylaminophenyl) - 3 - methylbenzothiazolium bromide complex with resorcinol; 2 - (p-diethylaminophenyl)-3,6-dimethylbenzothiazolium iodide complex with resorcinol; 2-(p-di-n-propylaminophenyl)-3-methylbenzothiazolium iodide complex with resorcinol; and 2-(p-diisobutylaminophenyl)-4,5-dimethyl-3-n-butylbenzothiazolium iodide complex with thiourea.

Example 15

In other operations, 20 parts by weight of one of the compounds to be employed according to the present invention are mechanically mixed with 80 parts of soy bean meal to produce animal feed compositions containing 20 percent of one of the compounds. In this operation, such animal feed compositions are prepared with the compounds identified in Examples 13 and 14 and with 2-(p-di-n-butylaminophenyl) - 5 - tert-butyl-3-methylbenzothiazolium methyl sulfate complex with guanidine; 2-(p-diethylaminophenyl) - 4 - methoxy-3-ethylbenzothiazolium chloride hydrochloride complex with urea; 2-(p-di-n-butylaminophenyl) - 5 - bromo-3-n-propylbenzothiazolium n-propyl sulfate complex with urea; 2 - (p-diethylaminophenyl) - 4 - methyl - 6-isopropyl-3-isobutylbenzothiazolium bromide complex with biuret; 2-(p-diisobutylaminophenyl) - 5 - methoxy - 6-methyl-3-ethylbenzothiazolium ethyl sulfate complex with urea; 2-(p-di-n-propylaminophenyl) - 6-ethyl-7-bromo-3-methylbenzothiazolium chloride complex with urea; 2-(p-ethylmethylaminophenyl)-5-n-butyl - 6 - chloro-3-methylbenzothiazolium dihydrogen phosphate complex with urea; 2-(p-ethylisobutylaminophenyl) - 5,6-di-methoxy-3-n-butylbenzothiazolium iodide complex with biuret; 2-(p-ethyl-n-propylaminophenyl)-4-ethoxy-7-sec-butoxy-3-ethylbenzothiazolium ethyl sulfate complex with thiourea; 2-(p-methyl-n-butylaminophenyl)-5 - bromo-6-ethoxy-3-n-butylbenzothiazolium n-butyl sulfate complex with guanidine; 2-(p-diethylaminophenyl)-4-chloro-6-tert-butoxy-3-methylbenzothiazolium dihydrogen phosphate complex with urea; and 2-(p-ethyl-n-propylaminophenyl) - 4,7-dibromo-3-ethylbenzothiazolium hydrogen sulfate complex with guanidine.

Example 16

In an additional operation, one of the subject compounds to be employed according to the present invention is dispersed in 90 parts of cottonseed oil to prepare an edible oil composition containing the compound. Such compositions are prepared with each of the subject compounds of Examples 13, 14, and 15 and with 2-(p-methyl-n-butylaminophenyl) - 5 - bromo-6-chloro-3-isobutylbenzothiazolium dihydrogen phosphate complex with urea; 2-(p-ethyl-n-propylaminophenyl) - 4,7-dibromo-3-ethylbenzothiazolium hydrogen sulfate complex with biuret; 2-(p-diethylaminophenyl) - 5 - bromo-3,6-diethylbenzothiazolium p-toluenesulfonate complex with resorcinol; 2 - (p-methyl-n-butylaminophenyl) - 5 - bromo-6-chloro-3-isobutylbenzothiazolium isobutyl sulfate complex with thiourea; and 2 - (p-dimethylaminophenyl)-4,6-dichloro-3-n-propylbenzothiazolium dihydrogen phosphate complex with resorcinol.

These compositions are adapted to be administered to animals to supply the desired dosage of active compound or to be employed as concentrates and subsequently diluted with additional edible adjuvants, grain rations, or animal feeds, to produce animal feed compositions containing the desired amount of active agents.

Example 17

Each of the subject compounds as identified in Examples 13, 14, 15, and 16 is employed to prepare an animal feed composition containing 0.015 percent by weight of one of the subject compounds. In these procedures, the particular subject compound is dispersed in a commercial swine feed to produce the feed composition. These compositions are of outstanding nutritive value and are adapted to be fed to animals to obtain a growth-furthering effect and superior feed efficiency. The compositions are also useful in animal husbandry to control parasitic organisms. In particular, such compositions are useful to control the larvae of parasitic organisms and to prevent and/or control the attack of migrating larvae of parasitic organisms, such as *Ascaris lumbricoides* var. *suum*.

Example 18

In a further embodiment, the compounds to be employed in accordance with the present invention, or compositions containing the same, advantageously can be employed in the present methods and compositions in combination with one or more other feed additives, including agents active against parasitic organisms, antibiotic materials, hormone and hormone-like materials and agents to improve feed efficiency. Such feed additives can be included either as adjuvants or as supplemental materials. Representative feed additives and agents include chlortetracycline, oxytetracycline, penicillin, bacitracin and bacitracin salts, streptomycin, tyosin, hygromycin, erythromycin, oleandomycin, 4-aminophenyl-arsonic acid, sodium arsanilate, 3-nitro-4-hydroxyphenyl-arsonic acid, oil of chenopodium, sodium fluoride, cadmium oxide, cadmium anthranilate, and piperazine and substituted piperazine compounds.

In representative operations, each of the food additives identified in the preceding paragraph together with one of the compounds shown in Examples 13, 14, 15 and 16 is mechanically mixed and ground with commercial swine feed to produce animal feed compositions. In such operations, the materials are employed in amounts sufficient to provide food compositions containing 0.00125 percent by weight of one of the feed additives identified in the preceding paragraph and 0.006 percent by weight of one of the compounds shown in Examples 13, 14, 15 and 16. These compositions are of excellent value in animal husbandry and are adapted to be fed to swine to obtain a growth-furthering effect and superior feed efficiency and to mitigate against the attack of parasitic organisms and particularly the attack of larvae of parasitic organisms such as *Ascaris lumbricoides* var. *suum*.

Examples 19

2 - (p-dimethylaminophenyl)-3,6-dimethylbenzothiazolium chloride 1:2 complex with urea, hemihydrate, was dispersed in a commercial swine feed to produce an animal feed composition containing 0.012 percent of the subject compound by weight of the ultimate animal feed composition. Two groups of swine were employed; all of the swine were of the same history and past environment and were 5 to 6 weeks old. Feeding of the swine was begun, one group (the treated group) being fed the modified animal feed composition containing the subject compound, the other group (the control group) being fed the unmodified commercial swine feed. Simultaneously with the initiation of the feeding and 17 days thereafter, all of the swine were weighed and the average weight for each group determined. Seventy-two hours after initiation of the feeding, each animal was inoculated with 25,000 embryonated ova of *Ascaris lumbricoides* var. *suum;* a second inoculation of each animal with 25,000 embryonated ova of *Ascaris lumbaricoides* var. *suum* was made ninety-six hours following initiation of the feeding. Thereafter, the swine were observed for the remainder of the 17-day period following initiation of the feeding for symptoms of the attack of migrating larvae of *Ascaris lumbricoides* var. *suum*. About 7 days after the first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of *Ascaris lumbricoides* var. *suum* in the respiratory system. In the treated group, no symptoms of the attack of migratory Ascaris larvae were observed at any time, and the swine were judged to be in all respects normal and healthy.

The average weight per animal for each of the groups, the average weight gained per animal for each of the groups, and the feed efficiency factor for each of the groups, are set forth in the following table.

|  | Average Weight per Animal in Pounds | | Average weight gained per animal in pounds | Feed efficiency per group |
|---|---|---|---|---|
|  | Upon initiation of feeding | 17-days following initiation of feeding | | |
| Treated group | 23.1 | 41.3 | 18.2 | 2.75 |
| Control group | 23.0 | 32.1 | 9.1 | 3.38 |

Example 20

In further operations, various products to be employed in accordance with the present invention were evaluated for the control of Ascaris lumbricoides var. suum in swine. In these operations, each of the subject compounds was separately dispersed in a commercial swine feed to produce an animal feed composition containing 0.012 percent of the subject compound by weight of the ultimate animal feed composition. In these operations, groups of swine were employed; all of the swine were of the same history and past environment and were 5 to 6 weeks old. Feeding of the swine was begun, each treated group being fed a modified animal feed composition containing one of the subject compounds, the remaining group (the control group) being fed the unmodified commercial swine feed. Seventy-two hours after initiation of the feeding, each animal was inoculated with 25,000 embryonated ova of Ascaris lumbricoides var. suum; a second inoculation of each animal with 25,000 embryonated ova of Ascaris lumbricoides var. suum was made ninety-six hours following initiation of the feeding. Thereafter, the swine were observed for the remainder of the 17-day period following initiation of the feeding for symptoms of the attack of migrating larvae of Ascaris lumbricoides var. suum. About 7 days after the first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of Ascaris lumbricoides var. suum in the respiratory systems. In each of the treated groups, no symptoms of the attack of migratory Ascaris larvae were observed at any time, and the swine were judged to be in all respects normal and healthy.

At the end of the seventeen-day period, all of the animals were necropsied and the liver of each examined for the presence of lesions caused by migrating larvae of Ascaris lumbricoides var. suum. The absence of lesions was taken as a 100 percent kill and control of Ascaris lumbricoides var. suum. The results are set forth in the following table:

| Subject compound: | Percent kill and control of Ascaris lumbricoides var. suum |
|---|---|
| 2-(p-dimethylaminophenyl) - 3,6 - dimethylbenzothiazolium chloride 1:2 complex with thiourea | 100 |
| 2-(p-dimethylaminophenyl) - 3,6 - dimethylbenzothiazolium chloride 1:1 complex with urea, monohydrate | 100 |
| 2-(p-dimethylaminophenyl) - 3,6 - dimethylbenzothiazolium iodide, 1:1 complex with urea | 100 |
| 2-(p-dimethylaminophenyl) - 3,6 - dimethylbenzothiazolium chloride 1:1 complex with guanidine hydrochloride, dihydrate | 100 |

In the liver of each animal of the control group, large numbers of lesions were found.

Example 21

2 - (p-dimethylaminophenyl)-3,6-dimethylbenzothiazolium chloride 1:1 complex with resorcinol is evaluated for the control of Ascaris lumbricoides var. suum in its infective phase outside of the host animal body. In this evaluation, control is determined by subsequent inoculation of host animal with the treated infective stage. As host animal, swine are employed; all of the swine are of the same history and past environment and are 5 to 6 weeks old. The swine are divided into two groups.

In the evaluation procedures, a culture of viable embryonated Ascaris lumbricoides var. suum ova is treated by dispersing it in water to which has been added 0.03 percent of 2-(p-dimethylaminophenyl)-3,6-dimethylbenzothiazolium chloride 1:1 complex with resorcinol. The resulting composition is held for about 1 hour under conditions conducive to the continued existence of the embryonated ova. Thereafter, each of the swine of one group (the treated group) is dosed with a quantity of the composition containing about 25,000 Ascaris lumbricoides var. suum ova. The remainder of the treating composition is held for 24 hours, similarly under conditions conducive to the continued existence of the embryonated Ascaris ova, and then an additional administration of a quantity of the composition containing about 25,000 Ascaris ova is made to each swine of the treated group. Both administrations are carried out orally by the use of a syringe.

Simultaneous with these administrations, each swine of the other group is separately inoculated with untreated viable embryonated ova of Ascaris lumbricoides var. suum to serve as a control group. About 25,000 ova are administered to each swine on each of the two occasions and the administrations are carried out orally by the use of a syringe.

Both groups of swine are maintained under normal and identical growing conditions for a period of about 2 weeks, being fed throughout this period with an unmodified commercial swine feed. During this period, all of the swine are observed for symptoms of the attack of migrating larvae of Ascaris lumbricoides var. suum. About 7 days after the first inoculation thereof with the Ascaris larvae, the swine of the control group exhibit symptoms of the attack of Ascaris larvae, namely elevated temperatures, respiratory difficulties such as coughing and labored breathing, and disturbances of growth, such as anorexia, all such symptoms being attributable to the presence of the migrating larvae of Ascaris lumbricoides var. suum in the respiratory system. In the treated group of swine, no symptoms of the attack of migratory Ascaris larvae are observed at any time and the swine are judged to be in all respects normal and healthy.

At the end of the 2-week period, all of the swine are necropsied and the liver of each examined for the presence of lesions caused by the migrating larvae of Ascaris lumbricoides var. suum. In the treated group of swine, no lesions are found in the liver. In the control group of swine, the liver of each shows numerous lesions.

Example 22

Fecal droppings were collected from mice known to be heavily infested with Nematospiroides dubius and voiding large numbers of eggs of Nematospiroides dubius. The fecal droppings which were collected consisted of about 150 fecal pellets; these were ground and the ground pellets divided into three sections. One section (the untreated section) was mixed with a small quantity of water. A second section (treated section A) was mixed with the same quantity of water to which had been added 2-(dimethylaminophenyl)-3,6-dimethylbenzothiazolium chloride 1:1 complex with resorcinol in an amount representing .3 percent by weight of the quantity of water employed. A third section (treated section B) was mixed with the same quantity of water to which had been added 2-(dimethylaminophenyl) 3,6-dimethylbenzothiazolium chloride 1:2 complex with urea, hemihydrate, in an amount representing .3 percent by weight of the quantity of water employed.

Each of the sections was spread on several thicknesses of filter paper and held for 5 days under essentially identical conditions, conducive to the development of larvae of Nematospiroides dubius. During the 5-day period, the filter papers were moistened as needed. At the end of the 5-day period, a sample was taken from each of the sections and examined microscopically for the presence of larvae of Nematospiroides dubius. In the sample from the untreated section, large numbers of larvae were seen; in the samples from treated section A and treated section B, no larvae were seen.

Example 23

2 - (p-dimethylaminophenyl)-3,6-dimethylbenzothiazolium chloride 1:2 complex with urea hemihydrate was evaluated for growth stimulation effects in chicks. In this evaluation, the subject compound was incorporated in a chicken feed, of standard composition except that no antibiotic was included therein, to obtain a modified feed containing 50 grams of the compound per ton of ultimate modified feed (corresponding to 0.0055 percent of the compound in the modified feed). One-day old chicks, each weighing 45 grams, were employed; the chicks were divided into two groups. In the evaluation, one group, consisting of four replications of three chicks each, was fed the modified feed and the other group, also consisting of four replications of three chicks each was fed unmodified feed to serve as a control. Both groups were maintained under the same conditions for a period of two weeks. At the end of the two weeks, the chicks were again weighed and the amount of gain for each chick determined. Thereafter, an average gain per chick was calculated for each of the groups. The results were as follows:

| | Average gain per bird in grams |
|---|---|
| Group on modified feed | 174.3 |
| Control group | 148.6 |

Hence, the group on modified feed exhibited a weight gain 17.2 percent greater than the weight gain exhibited by the control group.

Example 24

2 - (p-dimethylaminophenyl)-3,6-dimethylbenzothiazolium chloride 1:1 complex with resorcinol was evaluated for growth stimulation. The evaluation was carried out in accordance with the procedures of Example 23 except that the modified feed contained the subject compound in the amount of 20 grams of compound per ton of ultimate modified feed (0.0022 percent). The results were as follows:

| | Average gain per bird in grams |
|---|---|
| Treated group | 186.44 |
| Control group | 174.33 | corresponding to a 6.9 percent greater weight gain in the treated group than in the control group.

All of the compounds to be employed in accordance with the present invention are prepared by reacting the benzothiazolium compound, as previously defined, with the phenolic or urea compound, also each as previously defined. Conveniently, the reaction is carried out in an inert liquid reaction medium such as methanol. Good results are obtained when the phenolic compound or urea compound is employed in an amount in excess of the stoichiometric amount. Ordinarily, the product appears in the reaction mixture as a precipitate. This precipitate is conveniently separated by filtration and, if desired, the separated product is purified by washing with a further quantity of the inert liquid reaction medium or by recrystallization and the purified product dried.

The benzothiazolium compound employed as discussed foregoing is itself prepared by known procedures. In one such procedure, an aminobenzenethiol compound of the formula

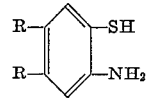

is reacted at temperatures of about 150° C. with a (dialkylamino)benzene compound of the formula

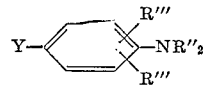

In the (dialkylamino)benzene compound, Y can be any of numerous acidic functional groups, such as carboxy (—COOH),

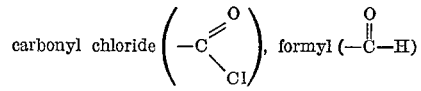

cyano (—CN), and the like; generally, a (dialkylamino)-benzene reactant wherein Y represents formyl is employed. The reaction goes forward in the presence or absence of an inert liquid reaction medium to prepare a benzothiazole compound of the formula

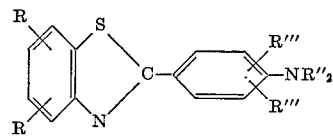

This benzothiazole compound is separated by sublimation, solvent extraction, or recrystallization.

Thereafter, the separated benzothiazole compound is quaternized by reaction with an appropriate quaternizing agent, such as a primary loweralkyl halide, di-primary loweralkyl sulfate, or primary loweralkyl ester of p-toluene sulfonic acid. In many instances, the quaternizing agent, particularly the primary loweralkyl halide, is conveniently prepared in situ. For example, the quaternizing agent methyl chloride can be prepared in situ by employing methanol and hydrochloric acid. In the quaternization reaction, it is preferable to employ one equimolecular quantity of benzothiazole compound and one or more equimolecular quantities of quaternizing agent. Good results are obtained when the quaternization is conducted at temperatures of from about 100° C. to about 160° C. Preferably, the quaternization is conducted in an inert liquid reaction medium; in many instances, an excess amount of one of the quaternizing agents or of one of the reagents employed to prepare the quaternizing agent in situ is employed as inert liquid reaction medium. As a result of such quaternization procedures, there is prepared the benzothiazolium compound wherein X represents halide, —R'SO$_4$, or

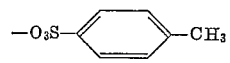

This benzothiazolium compound is separated from the reaction mixture in any of the conventional separation techniques. For example, the benzothiazolium compound sometimes precipitates and is separated by filtration. In other instances, the reaction mixture containing the benzothiazolium compound as a product becomes a solid mass during the course of the reaction, and the reaction product is taken up in, and recrystallized from, a solvent, such as acetone, an alcohol, which can be methanol, ethanol, or isopropanol, or a mixture of such alcohol with another solvent, such as ether or benzene. In yet other instances, the benzothiazolium compound is extracted from the reaction mixture with water, a "salting out agent" added to the resulting aqueous extract to recipitate the product, and the precipitated product separated by filtration. In such procedures, the salting out agent can be any inorganic salt having as an anion the desired X moiety. Commonly, sodium salts are employed as salting out agents, such as sodium halide, sodium hydrogen sulfate, sodium primary loweralkyl sulfate, sodium dihydrogen phosphate, or sodium methanesulfonate. Thus, in this procedure are prepared and separated all of the benzothiazolium compounds. These compounds are purified, if desired, by conventional procedures, such as recrystallization from solvent.

In another procedure, a nitrobenzene compound of the formula

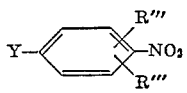

wherein the symbol Y has the same meaning as above defined, is reacted with the aminobenzenethiol compound as previously defined to prepare an intermediate compound of the formula

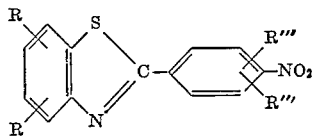

The nitro moiety of this intermediate compound is thereafter reduced, in any of various procedures, such as reaction of the compound with iron and hydrochloric acid, to prepare a product of the formula

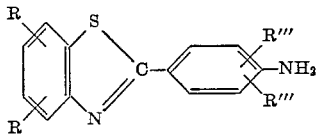

This product is thereafter reacted with an appropriate primary loweralkylating agent, or with two different primary loweralkylating agents simultaneously or successively, to prepare the benzothiazole compound as above defined, which is quaternized and separated in the manner hereinabove discussed to prepare all products of the benzothiazolium compound to be employed according to the present invention. This procedure is most conveniently employed for only those products wherein both primary loweralkyl groups on the ar-amino nitrogen atom are the same.

Those products to be employed according to the present invention in which the benzothiazolium compound has the formula

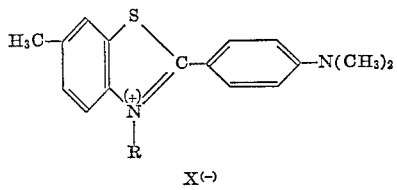

constitute a preferred embodiment because of the directness of their synthesis and because of the exceptional performance of methods and compositions containing them in accordance with the present invention. These products are conveniently prepared in yet another known procedure. In this procedure, p-toluidine is heated with sulfur, in the proportion of two moles of p-toluidine to 4 or 5 atoms of sulfur and at elevated temperatures such as, about 200° C. As a result, there is prepared a mixture of products, including a product of the formula

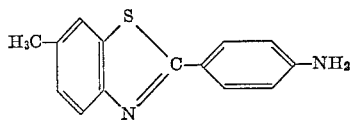

This product is separated from the reaction mixture and from the other products in known procedures and thereafter reacted with a primary loweralkylating agent, and the resulting alkylated benzothiazole product is quaternized according to the procedures hereinabove discussed.

When all R' and R" moieties in a given benzothiazolium compound are the same, it is convenient to conduct the primary loweralkylation and the quaternization steps concurrently. In such procedures, a compound of the formula

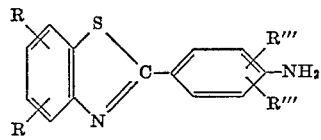

is employed. For example, when all of the R' and R" moieties in a given compound represent —CH₃, the above compound is reacted with methanol and hydrochloric or sulfuric acid at temperatures of about 150°–200° C. Preferably, the reaction is conducted under superatmospheric pressure. When sulfuric acid is employed in this method, the yield of product is increased by supplying to the reaction mixture a small catalytic amount of bromide ion, in the form of an alkyl or aralkyl bromide or a soluble inorganic bromide.

Many of the benzothiazolium complexes form hydrates upon contact with water, such as during preparation procedures. However, when it is desired to obtain a hydrate form of a complex which is not initially hydrated, such hydrate is prepared by mixing the complex with water and separating the resulting hydrate, or by exposing the complex to moist atmosphere over a period of time. When it is desired to employ as active agent a complex which is not a hydrate, the corresponding hydrate is dehydrated by any of the known procedures, such as oven-drying, drying in the presence of a desiccating agent, and the like.

The present application is directed to and concerned with the disclosure and claiming of the invention as described hereinbefore. The present application is also directed to the disclosure and claiming of the invention in methods, or compositions comprising or employing any subgeneric group or class of compounds which may be obtained by any permutation or combination of the alternative expressions in the definition of active material to be found hereinbefore.

I claim:
1. Method for the control of helminth parasitic organisms, which comprises contacting the parasitic roganism with a parasiticidal amount of an active material which is a complex of a benzothiazolium compound of the formula

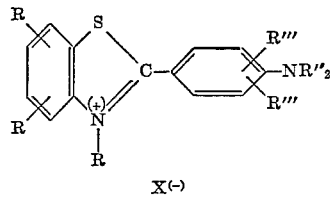

with a phenolic compound or a urea compound, wherein, in said benzothiazolium compound, X represents a member selected from the group consisting of halide,

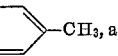

each R independently represents a member selected from the group consisting of hydrogen, loweralkyl, loweralkoxy, bromo and chloro; each R' and R" independently represents primary loweralkyl; and each R''' independently represents a member selected from the group consisting of hydrogen, chloro, methoxy, and methyl; and

23 wherein the phenolic compound corresponds to the formula

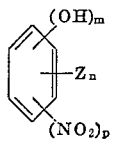

wherein each Z independently represent a member selected from the group consisting of halo, alkyl of 1 to 6 carbon atoms, both inclusive, and loweralkoxy of 1 to 4 carbon atoms, both inclusive; the symbol $m$ represents an integer of from 1 to 6, both inclusive; the symbol $n$ represents an integer of from 0 to 5, both inclusive; and the symbol $p$ represents an integer of from 0 to 2, both inclusive, the sum of $m$, $n$ and $p$ being an integer of from 1 to 6, both inclusive; and the urea compound is a member selected from the group consisting of urea, thiourea, guanidine, guanidine hydrochloride and biuret; said benzothiazolium compound being in a molar ratio to the phenolic compound or the urea compound of M:N, wherein M and N each represents an integer of from 1 to 2, both inclusive, the sum of M and N being an integer of from 2 to 3, both inclusive.

2. The method of claim 1 wherein the parasitic organism is in its infective phase and the contacting is carried out outside of the host animal body.

3. The method of claim 2 wherein the active material is the one to one and to two complex of 2-(p-dimethylaminophenyl) - 3,6 - dimethylbenzothiazolium chloride with resorcinol.

4. The method of claim 2 wherein the active material is the one to one and to two complex of 2-(p-dimethylaminophenyl) - 3,6-dimethylbenzothiazolium chloride with urea.

5. The method of claim 1 wherein the parasitic organism is in the body of the host animal and the active material is orally administered in the amount of from 0.01 to 1,000 milligrams per kilogram of animal body weight.

6. The method of claim 5 wherein the active material is in intimate admixture with an innocuous ingestible adjuvant.

7. The method claimed in claim 6 wherein the material is the one to one and to two complex of 2-(p-dimethylaminophenyl) - 3,6-dimethylbenzothiazolium chloride with resorcinol.

8. The method claimed in claim 6 wherein the material is the one to one and to two complex of 2-(p-dimethylaminophenyl)-3-methylbenzothiazolium chloride with resorcinol.

9. The method claimed in claim 6 wherein the material is the one to one and to two complex of 2-(p-dimethylaminophenyl) - 3,6-dimethylbenzothiazolium chloride with urea.

10. The method claimed in claim 6 wherein the material is the one to one and to two complex of 2-(p-dimethylaminophenyl)-3,6-dimethylbenzothiazolium chloride with thiourea.

11. The composition for the control of helminth parasites in animals comprising from 0.5 to 98 percent by weight of an active ingredient in intimate admixture with a finely divided solid, the active ingredient being a complex of a benzothiazolium compound of the formula

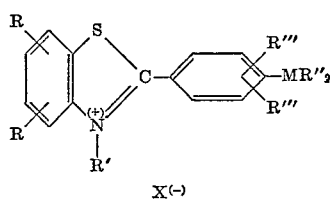

24 with a phenolic compound or a urea compound, wherein, in said benzothiazolium compound, X represents a member selected from the group consisting of halide, $-HSO_4$, $-R'SO_4$, $-H_2PO_4$, $-O_3S-\langle\phantom{xx}\rangle-CH_3$, and $-O_3S-CH_3$ each R independently represents a member selected from the group consisting of hydrogen, loweralkyl, loweralkoxy, bromo and chloro; each R' and R" independently represents primary loweralkyl; and each R''' independently represents a member selected from the group consisting of hydrogen, chloro, methoxy, and methyl; and wherein the phenolic compound corresponds to the formula

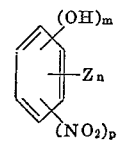

wherein each Z independently represents a member selected from the group consisting of halo, alkyl of 1 to 6 carbon atoms, both inclusive, and loweralkoxy of 1 to 4 carbon atoms, both inclusive; the symbol $m$ represents an integer of from 1 to 6, both inclusive; the symbol $n$ represents an integer of from 0 to 5, both inclusive; and the symbol $p$ represents an integer of from 0 to 2, both inclusive, the sum of $m$, $n$ and $p$ being an integer of from 1 to 6, both inclusive; and the urea compound is a member selected from the group consisting of urea, thiourea, guanidine, guanidine hydrochloride and biuret; said benzothiazolium compound being in a molar ratio to the phenolic compound or the urea compound of M:N, wherein M and N each represents an integer of from 1 to 2, both inclusive, the sum of M and N being an integer of from 2 to 3, both inclusive.

12. The composition of claim 11 wherein the finely divided solid is an edible finely divided solid.

13. The composition claimed in claim 11 wherein the material is the one to one and to two complex of 2-(p-dimethylaminophenyl)-3,6-dimethylbenzothiazolium chloride with resorcinol.

14. The composition claimed in claim 11 wherein the material is the one to one and to two complex of 2-(p-dimethylaminophenyl) - 3 - methylbenzothiazolium chloride with resorcinol.

15. The composition claimed in claim 11 wherein the material is the one to one and to two complex of 2-(p-dimethylaminophenyl)-3,6-dimethylbenzothiazolium chloride with urea.

16. The composition claimed in claim 11 wherein the material is the one to one and to two complex of 2-(p-dimethylaminophenyl)-3,6-dimethylbenzothiazolium chloride with thiourea.

17. The animal feed containing from about 0.0001 up to 95 percent by weight of a helminth parasiticidal complex of a benzothiazolium compound of the formula

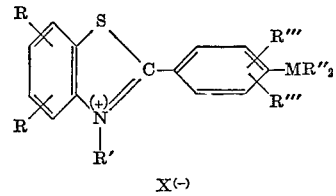

with a phenolic compound of a urea compound, wherein, in said benzothiazolium compound, X represents a member selected from the group consisting of halide, $-HSO_4$, $-R'SO_4$, $-H_2PO_4$, $-O_3S-\langle\phantom{xx}\rangle-CH_3$, and $-O_3S-CH$ each R independently represents a member selected from the group consisting of hydrogen, loweralkyl, loweralkoxy, bromo and chloro; each R' and R" independently represents primary loweralkyl; and each R''' independently represents a member selected from the group consisting of hydrogen, chloro, methoxy, and methyl; and wherein the phenolic compound corresponds to the formula

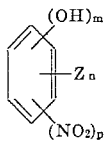

wherein each Z independently represents a member selected from the group consisting of halo, alkyl of 1 to 6 carbon atoms, both inclusive, and loweralkoxy of 1 to 4 carbon atoms, both inclusive; the symbol $m$ represents an integer of from 1 to 6, both inclusive; the symbol $n$ represents an integer of from 0 to 5, both inclusive; and the symbol $p$ represents an integer of from 0 to 2, both inclusive, the sum of $m$, $n$ and $p$ being an integer of from 1 to 6, both inclusive; and the urea compound is a member selected from the group consisting of urea, thiourea, guanidine, guanidine hydrochloride and biuret; said benzothiazolium compound being in a molar ratio to the phenolic compound or the urea compound of M:N, wherein M and N each represents an integer of from 1 to 2, both inclusive, the sum of M and N being an integer of from 2 to 3, both inclusive.

18. The composition of claim 17 wherein the complex is the one to one and to two complex of 2-(p-dimethylaminophenyl)-3,6-dimethylbenzothiazolium chloride with resorcinol.

19. The composition of claim 17 wherein the complex is the one to one and to two complex of 2-(p-dimethylaminophenyl) - 3,6 - dimethylbenzothiazolium chloride with urea.

References Cited
UNITED STATES PATENTS

| | | | |
|---|---|---|---|
| 3,074,938 | 1/1963 | Capps | 167—53 |
| 3,180,735 | 4/1965 | Titus | 167—53 |
| 2,719,866 | 10/1955 | Gerzon | 167—53 |
| 3,334,082 | 8/1967 | Reifschneider | 167—53 |

OTHER REFERENCES

Chemical Abstracts (I), vol. 41, p. 5013(a) (1950).
Chemical Abstracts (II), vol. 46, p. 10556(f) 1952.
Chemistry of Dye-Stuffs, Georgievics, London, Scott, Greenwood & Co. (1903) p. 121.

FRANK CACCIAPAGLIA, Jr., Primary Examiner